(12) United States Patent
Tsukamoto

(10) Patent No.: US 10,153,911 B2
(45) Date of Patent: Dec. 11, 2018

(54) INFORMATION PROCESSING SYSTEM, INFORMATION PROCESSING DEVICE, AND INFORMATION PROCESSING METHOD

(71) Applicant: Yuka Tsukamoto, Tokyo (JP)

(72) Inventor: Yuka Tsukamoto, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 336 days.

(21) Appl. No.: 14/542,775

(22) Filed: Nov. 17, 2014

(65) Prior Publication Data
US 2015/0149549 A1 May 28, 2015

(30) Foreign Application Priority Data

Nov. 28, 2013 (JP) .................................. 2013-245708
Oct. 3, 2014 (JP) .................................. 2014-205044

(51) Int. Cl.
*H04L 12/18* (2006.01)

(52) U.S. Cl.
CPC .................................. *H04L 12/1822* (2013.01)

(58) Field of Classification Search
USPC .......................................................... 709/204
See application file for complete search history.

(56) References Cited

U.S. PATENT DOCUMENTS

| | | | | |
|---|---|---|---|---|
| 5,634,121 A | * | 5/1997 | Tracz | ................ G06F 17/30014 |
| | | | | 707/755 |
| 6,119,147 A | * | 9/2000 | Toomey | ................ G06Q 10/109 |
| | | | | 709/204 |
| 8,743,022 B2 | | 6/2014 | Masuda et al. | |
| 2004/0199580 A1 | * | 10/2004 | Zhakov | ................ H04L 12/1818 |
| | | | | 709/204 |
| 2005/0044126 A1 | * | 2/2005 | Oogaki | ................ H04L 12/1822 |
| | | | | 709/200 |
| 2009/0219943 A1 | * | 9/2009 | Gobara | ................ H04L 29/06 |
| | | | | 370/419 |

(Continued)

FOREIGN PATENT DOCUMENTS

| | | |
|---|---|---|
| JP | 2011-034218 | 2/2011 |
| JP | 2012-108872 | 6/2012 |

*Primary Examiner* — Umar Cheema
*Assistant Examiner* — John Fan
(74) *Attorney, Agent, or Firm* — Harness, Dickey & Pierce, P.L.C.

(57) ABSTRACT

An information processing system includes an application that is included in an information processing terminal; and an information processing device for executing a function in response to a request from the application, wherein the information processing device is connected to the information processing system. The information processing system includes a request transmitter for transmitting a request including first identification information and second identification information, wherein the first identification information is for identifying information that is used for executing the function, and the second identification information is for identifying a plurality of different functions that is to be executed by using the information that is identified by the first identification information; and a processor for executing the functions that are identified based on the second identification information included in the received request by using the information that is identified based on the first identification information.

17 Claims, 12 Drawing Sheets

(56) References Cited

U.S. PATENT DOCUMENTS

| | | | | |
|---|---|---|---|---|
| 2012/0066334 A1* | 3/2012 | Morimura | ............ | H04L 12/1822 |
| | | | | 709/212 |
| 2012/0164946 A1* | 6/2012 | Fujiwara | ............. | H04L 12/1822 |
| | | | | 455/41.2 |
| 2015/0363153 A1* | 12/2015 | Kato | ......................... | G06F 3/14 |
| | | | | 345/629 |

* cited by examiner

FIG.4

| CONFERENCE ID | CONFERENCE NAME | DATE AND TIME OF CONFERENCE | CONFERENCE STATUS | SESSION PASSWORD | PARTICIPATION PASSWORD | DOCUMENT ID |
|---|---|---|---|---|---|---|
| xxxx-xxxxxxx | BOARD MEETING | 2013/10/10 13:00 | IN SESSION | PASS_XXXX | PASS_YYYY | .../server01/xxx.doc |
| yyyy-yyyyyyy | PRODUCT A LAUNCH APPROVAL MEETING | 2013/10/10 14:00 | TO BE HELD | AAAA | NONE | .../server01/yyy/doc |
| zzzz-zzzzzzz | PRODUCT B SALES REPRESENTATIVE MONTHLY MEETING | 2013/10/12 09:30 | TO BE HELD | NONE | NONE | .../server01/zzz.xls |
| ... | ... | ... | ... | ... | ... | ... |

3000

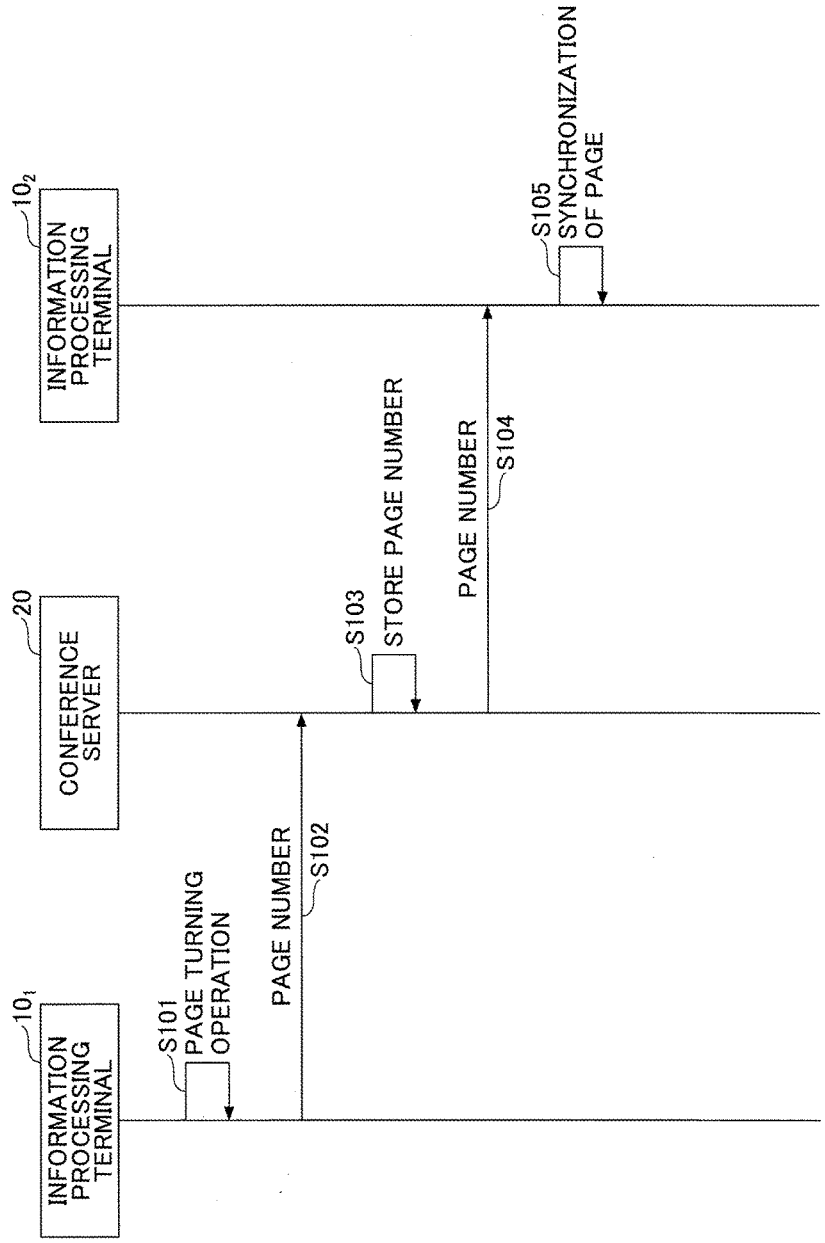

FIG.8A

| Room ID | CONFERENCE ID | PARTICIPANT |
|---|---|---|
| Room 001 | xxxx-xxxxxxx | user 01 |
| Room 002 | yyyy-yyyyyyy | user 02, user 05 |
| Room 003 | zzzz-zzzzzzz | user 03 |
| ... | ... | ... |

| Room ID | CONFERENCE ID | PARTICIPANT |
|---|---|---|
| Room 001 | xxxx-xxxxxxx | user 04 |
| Room 002 | aaaa-aaaaaaa | user 06, user 07 |
| ... | ... | ... |

5200

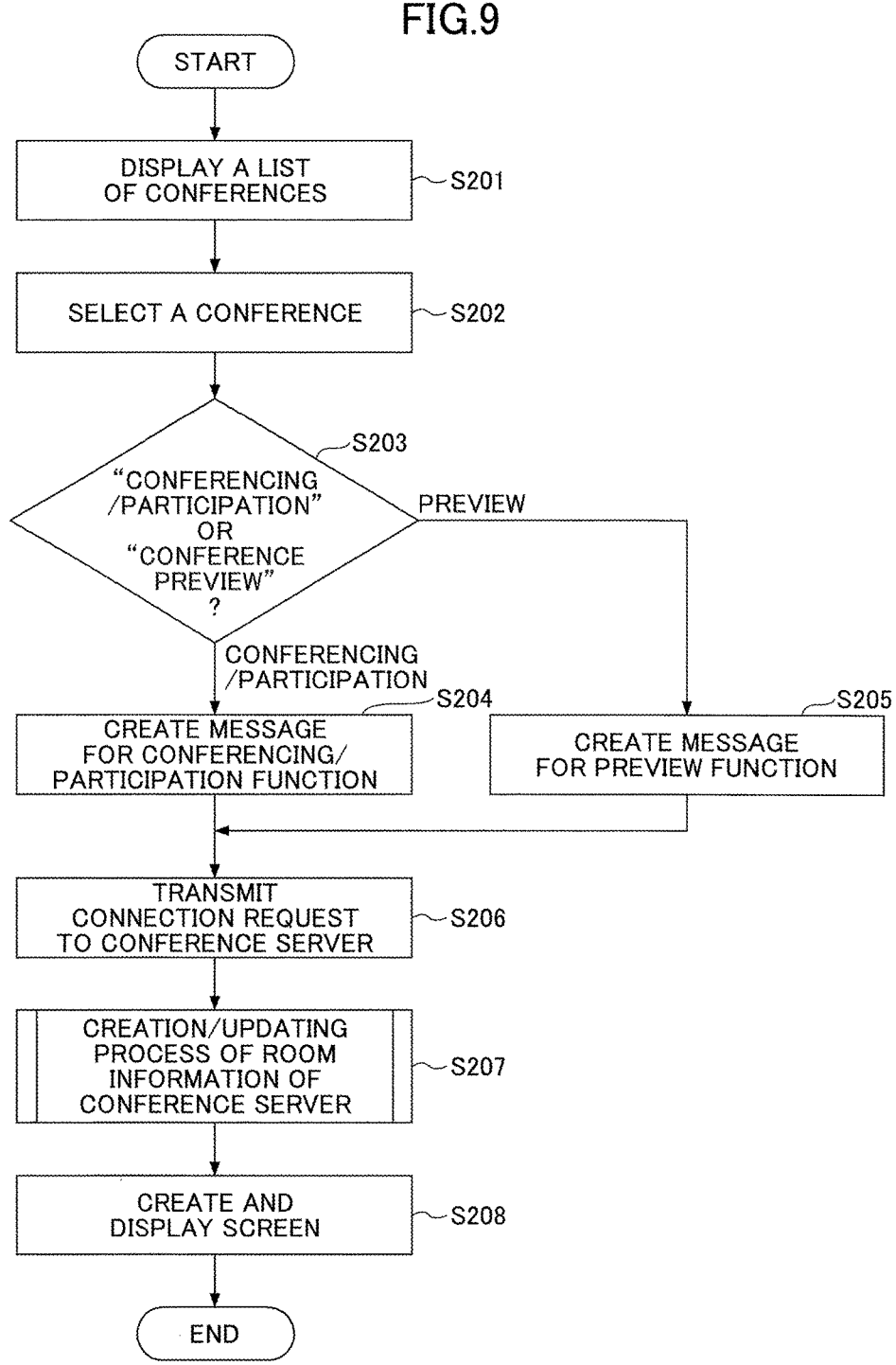

FIG.10

```
<presence to="****-*******@conference.***.com">
</presence>
```

FIG.11

```
<presence to="****-*******@preview.***.com">
</presence>
```

INFORMATION PROCESSING SYSTEM, INFORMATION PROCESSING DEVICE, AND INFORMATION PROCESSING METHOD

BACKGROUND OF THE INVENTION

1. Field of the Invention

The present invention relates to an information processing system, an information processing device, and an information processing method.

2. Description of the Related Art

An electronic conferencing system has been known that is for conducting teleconferencing by sharing data through a network and displaying the data among a plurality of information processing terminals.

For such an electronic conferencing system, a technique for system extension has been known (e.g., Patent Document 1 (Japanese Unexamined Patent Publication No. 2011-034218)).

SUMMARY OF THE INVENTION

According to the above-described technique, in order to extend the system, an application that is installed in an information processing terminal or the like may be significantly modified. Accordingly, a certain time period may be required to deliver a new function to a user.

There is a need for an information processing system, an information processing device, and an information processing method that are capable of determining, for each of a plurality of different functions, a function that is to be executed based on identification information.

According to an aspect of the present invention, there is provided an information processing system including an application that is included in an information processing terminal; and an information processing device for executing a function in response to a request from the application, wherein the information processing device is connected to the information processing system. The information processing system includes a request transmitter configured to transmit a request including first identification information and second identification information, wherein the first identification information is for identifying information that is used for executing the function, and the second identification information is for identifying a plurality of different functions that is to be executed by using the information that is identified by the first identification information; and a processor configured to execute the functions that are identified based on the second identification information included in the received request by using the information that is identified based on the first identification information.

According to another aspect of the present invention, there is provided an information processing device that is connected to an application that is included in an information processing terminal, wherein the information processing device is for executing a function in response to a request from the application. The information processing device includes a request receiver configured to receive the request including first identification information and second identification information, wherein the first identification information is for identifying information that is used for executing the function, and the second identification information is for identifying a plurality of different functions that is to be executed by using the information that is identified by the first identification information; and a processor configured to execute the functions that are identified based on the second identification information included in the received request by using the information that is identified based on the first identification information.

According to another aspect of the present invention, there is provided an information processing method to be executed by an information processing device that is connected to an application that is included in an information processing terminal, wherein the information processing device is for executing a function in response to a request from the application. The information processing method includes a step of receiving the request including first identification information and second identification information, wherein the first identification information is for identifying information that is used for executing the function, and the second identification information is for identifying a plurality of different functions that is to be executed by using the information that is identified by the first identification information; and a step of executing the functions that are identified based on the second identification information included in the received request by using the information that is identified based on the first identification information.

According to an embodiment of the present invention, for each of a plurality of different functions, a function can be determined that can execute the corresponding function, based on identification information.

Other objects, features and advantages of the present invention will become more apparent from the following detailed description when read in conjunction with the accompanying drawings.

BRIEF DESCRIPTION OF THE DRAWINGS

FIG. 4 is a configuration diagram of an example of conference information;

FIG. 5 is a sequence diagram of an example of a process for synchronizing a page turning operation;

FIGS. 6A-6D are image diagrams of an example of a conferencing/participation screen and a conference preview screen;

FIGS. 8A and 8B are configuration diagrams of examples of Room information;

FIG. 9 is a flowchart of an example of the process of selecting the execution function;

FIG. 10 is a diagram illustrating an example of a connection request for executing a conferencing/participation function;

FIG. 11 is a diagram illustrating an example of a connection request for executing a conference preview function.

DETAILED DESCRIPTION OF THE PREFERRED EMBODIMENTS

Hereinafter, an embodiment of the present invention is explained in detail. In this embodiment, a conferencing system is explained as an example.

<System Configuration>

Figure 1:
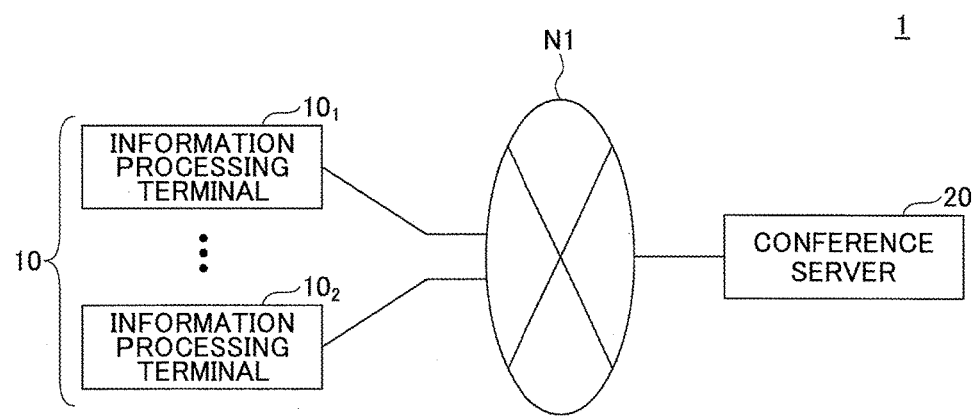
FIG. 1 is a configuration diagram of an example of a conferencing system according to an embodiment.

FIG. 1 is a configuration diagram of an example of a conferencing system according to the embodiment. In the conferencing system 1 that is shown in FIG. 1, one or more information processing terminals 10 and a conference server 20 are connected to a network N1 via a wired line or a wireless channel.

The conference server 20 may be software or a service that runs on a single computer. Alternatively, the conference server 20 may be software or a service that runs on one or more computers. For example, the conference server 20 may be in a form of a cloud service.

The information processing terminal 10 is a device that can be operated by a user. The information processing terminal 10 may be a personal computer (PC); a tablet terminal; a mobile information terminal, such as a smart phone, a cellular phone, or a PDA; a display device, such as an electronic whiteboard; a projection device, such as a projector; or a dedicated conference terminal, for example. The information processing terminal 10 may be an image forming device, such as a multifunction peripheral or a printer. The information processing terminal 10 may receive (download) conference materials. The information processing terminal 10 can display the received conference materials synchronously or asynchronously. Here, the conference material is electronic data of, for example, a document or a figure that may be used in the conference. The electronic data may be PDF data, Word data, PPT data, or Excel data, for example.

Here, the conference materials are explained for exemplifying purpose only. The usage of the conference materials are not limited to the conference. Namely, it suffices if the conference materials are electronic data, such as document data, image data, video data, or audio data, and the usage of the conference materials are not particularly limited.

The mode of the information processing terminal 10 for synchronously displaying the conference materials may be called a sharing mode, hereinafter. In the sharing mode, the information processing terminals 10 that are participating in the same conference may display the same page of the conference materials that are specified by the conference server 20. The mode of the information processing terminal 10 in which the conference materials are asynchronously displayed is called a personal mode, hereinafter. In the personal mode, even if the information processing terminal 10 is participating in the same conference, the information processing terminal 10 may temporarily display a page of the conference materials other than the page of the conference materials that is specified by the conference server 20.

The information processing terminal 10 can write a memo on the displayed conference materials through a touch panel or a keyboard, for example. The operation modes of the information processing terminal 10 may include a presenter mode that is for a presenter of the conference, and a participant mode that is for a participant of the conference. When a user makes an operation, such as an operation for writing a memo or a page turning operation, on the conference materials that are displayed by the information processing terminal 10 whose operation mode is the presenter mode and the sharing mode, the operation for writing a memo or the page turning operation is synchronously executed on the conference materials that are displayed on the other information processing terminals 10 whose operation mode is the participant mode.

Within the same conference, it is preferable that the operation mode of only one information processing terminal 10 can be the presenter mode at the same time. In addition, it is preferable that the information processing terminal 10 whose operation mode is the presenter mode can be switched by a user's operation.

The conference server 20 is an example of an information processing device. The conference server 20 may be a device for executing information processing for a conference. The conference server 20 may transmit conference materials to the information processing terminal 10. Additionally, the conference server 20 may transmit information for synchronizing an operation, such as an operation for writing a memo or a page turning operation, that is made by the information processing terminal 10 whose operation mode is the presenter mode among other information processing terminals 10. The conference server 20 may be a work station (WS) or a personal computer (PC). It is assumed that the conference server 20 and each of the information processing terminals 10 can communicate each other by a communication protocol, such as the TCP/IP. The conference server 20 may store registered conference information, user information, and so forth. The conference server 20 may store, for example, conference materials that are registered (uploaded) by the information processing terminal 10.

<Hardware Configuration>

Figure 2:
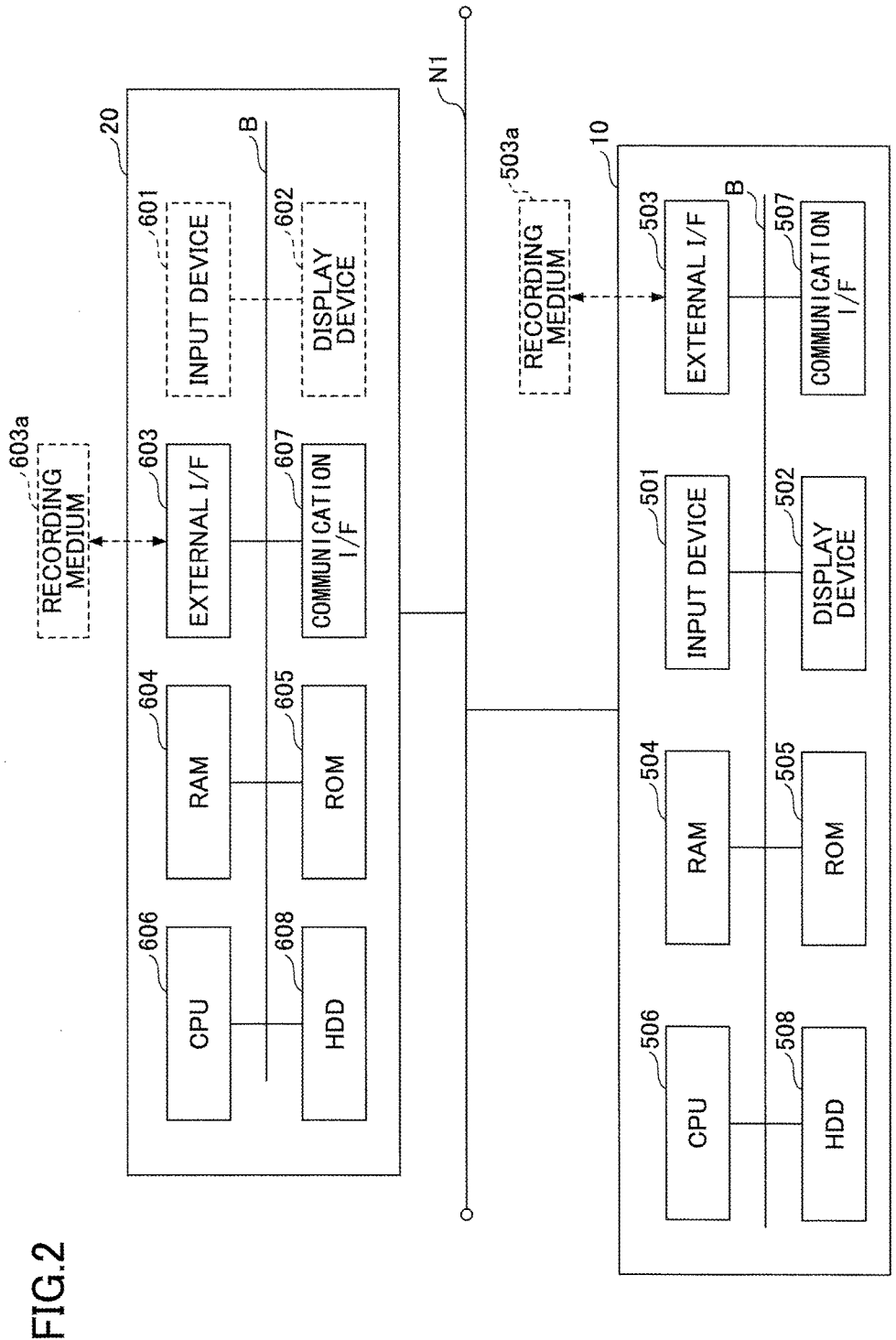
FIG. 2 is a hardware configuration diagram of an example of a computer that forms the conferencing system according to the embodiment.

The information processing terminal 10 and the conference server 20 may be achieved, for example, by a hardware configuration that is shown in FIG. 2.

FIG. 2 is a hardware configuration diagram of an example of a computer that forms the conferencing system according to the embodiment. The information processing terminal 10 that is shown in FIG. 2 includes, for example, an input device 501; a display device 502; an external I/F 503; a RAM 504; a ROM 505; a CPU 506; a communication I/F 507; and a HDD 508, which are mutually connected via a bus B. In addition, the information processing terminal 10 may include a camera, a microphone, and a speaker, for example.

The input device 501 may include a keyboard, a mouse, and a touch panel, for example. The input device 501 can be used for inputting various types of operation signals. The display device 502 may include a display, for example. The display device 502 can be used to display a result of processing by the information processing terminal 10. The communication I/F 507 is an interface for connecting the information processing terminal 10 to the network N1. The information processing terminal 10 can execute data communications with the conference server 20 through the communication I/F 507.

The HDD 508 is a non-volatile storage device for storing a program and data. The program and data that can be stored in the HDD 508 may include, for example, an operating system (OS) that is system software for controlling the information processing terminal 10 as a whole, and application software for providing various functions that run on the OS.

The external I/F 503 is an interface with an external device. The external device may be a recording medium 503a. The information processing terminal 10 can read information on the recording medium 503a and/or write information in the recording medium 503a through the external I/F 503. The recording medium 503 may be a flexible disk, a CD, a DVD, a SD memory card, or a USB memory, for example.

The ROM 505 is a non-volatile semiconductor memory (storage device) that can store a program and data even if the power supply is turned off. The ROM 505 may store a program and data, such as the Basic Input/Output System (BIOS) that is executed during activation of the information processing terminal 10, OS settings, and network settings. The RAM 504 is a volatile semiconductor memory for temporarily storing a program and data.

The CPU 506 is a processing device for controlling the information processing terminal 10 as a whole and for achieving functions of the information processing terminal 10 by reading out a program and data from a storage device, such as the ROM 505 and the HDD 508, onto the RAM 504 and by executing a process.

In addition to the above configuration, the information processing terminal 10 may include an input device and/or an output device, such as a camera, a microphone, and a speaker.

The information processing terminal 10 can achieve various functions that are described below by running a program with the above-described hardware configuration, for example.

The conference server 20 that is shown in FIG. 2 includes, for example, an input device 601; a display device 602; an external I/F 603; a RAM 604; a ROM 605; a CPU 606; a communication I/F 607; and a HDD 608, which are mutually connected via the bus B. Optionally, the conference server 20 may have a configuration such that the input device 601 and the display device 602 are connected depending on necessity.

The input device 601 may include a keyboard and a mouse, for example. The input device 601 can be used for inputting various types of operation signals to the conference server 20. The display device 602 may include a display, for example. The display device 602 can be used to display a result of processing by the conference server 20.

The communication I/F 607 is an interface for connecting the conference server 20 to the network 14. The conference server 20 may execute data communication with the information processing terminal 10 through the communication I/F 607.

The HDD 608 is a non-volatile storage device for storing a program and data. The program and data that can be stored in the HDD 608 may include, for example, an operating system (OS) that is system software for controlling the conference server 20 as a whole, and application software for providing various functions that run on the OS.

The external I/F 603 is an interface with an external device. The external device may be a recording medium 603a, for example. The conference server 20 can read information on the recording medium 603a and/or write information in the recording medium 603a through the external I/F 603. The recording medium 603 may be a flexible disk, a CD, a DVD, a SD memory card, or a USB memory, for example.

The ROM 605 is a non-volatile semiconductor memory (storage device) that can store a program and data even if the power supply is turned off. The ROM 605 may store a program and data, such as the Basic Input/Output System (BIOS) that is executed during activation of the conference server 20, OS settings, and network settings. The RAM 604 is a volatile semiconductor memory for temporarily storing a program and data.

The CPU 606 is a processing device for controlling the conference server 20 as a whole and for achieving functions of the conference server 20 by reading out a program and data from a storage device, such as the ROM 605 and the HDD 608, onto the RAM 604 and by executing a process.

The conference server 20 can achieve various functions that are described below by running a program with the above-described hardware configuration, for example.

<Software Configuration>

Figure 3:
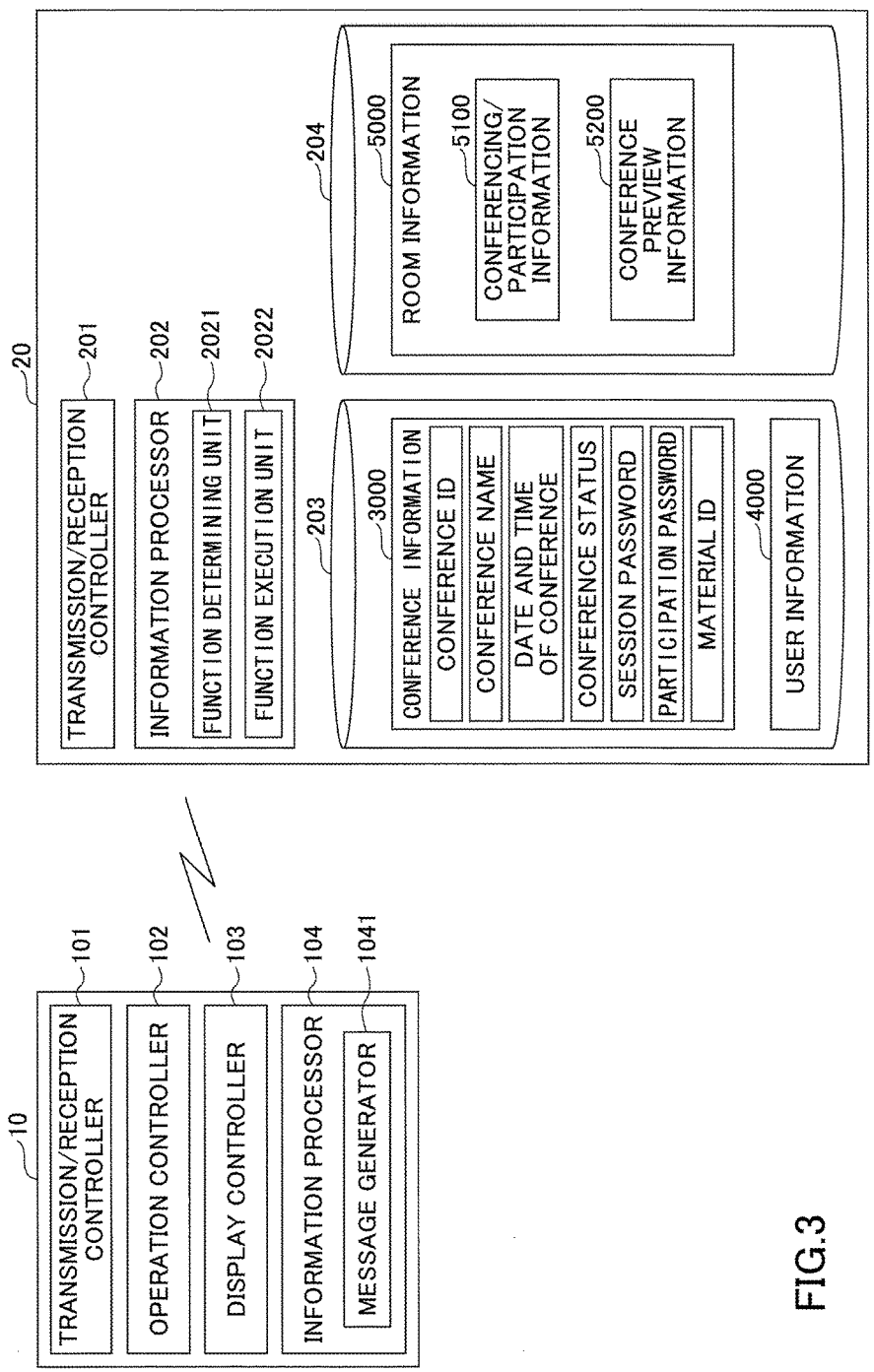
FIG. 3 is a functional block diagram of the example of the conferencing system according to the embodiment.

The conference system 1 according to the embodiment can be achieved by the functional blocks that are shown in FIG. 3, for example. FIG. 3 is a functional block diagram of an example of the conference system according to the embodiment.

<<Information Processing Terminal 10>>

The information processing terminal 10 may implement a transmission/reception controller 101; an operation controller 102; and a display controller 103 by running a program, such as a conference application. The information processor 104 includes a message generator 1041.

The transmission/reception controller 101 is for executing a communicating process with the conference server 20 through the communication I/F 507. The operation controller 102 is for executing a process that corresponds to an operation signal that is input to the input device 501 by a user.

The display controller 103 is for executing a process of outputting shared conference materials to the display device 502. The display controller 103 may execute a process for displaying a written memo on the conference materials or a process of displaying the specified page, in response to an operation of writing the memo or a page turning operation on the shared conference materials.

The information processor 104 may be implemented by the CPU 506. The information processor 104 is for executing various types of operations of the information processing terminal 10. The message generator 1041 may generate a connection request with respect to the conference server 20.

<<Conference Server 20>>

The conference server 20 may implement a transmission/reception controller 201; an information processor 202; a conference information storage unit 203; and a Room information storage unit 204 by running a program. The information processor 202 includes a function determining unit 2021 and a function execution unit 2022.

The conference information storage unit 203 and the Room information storage unit 204 may be included in another server that can transmit and receive data that is from the conference server 20.

The transmission/reception controller 201 may execute a communication process with the information processing terminal 10 through the communication I/F 607. The information processor 202 may be implemented by the CPU 606. The information processor 202 may execute various processes of the conference server 20. The function determining unit 2021 is for determining a function to be executed by the function execution unit 2022 based on destination information that is included in a connection request from the information processing terminal 10. The function execution unit 2022 may execute a function that is specified in accordance with an instruction from the function determining unit 2021. The destination information may be information that can be expressed by a form, such as "conference ID@domain name." As described below, the conference server 20 may determine a function to be executed based on a domain name of the destination information, and the conference server 20 may execute the function by using conference information that is specified as the conference ID.

The destination information is not limited to the information that can be expressed by the above-described form that is "conference ID@domain name." For example, the destination information may be an IP address.

The conference information storage unit 203 is for storing conference information 3000 and user information 4000.

The conference information 3000 is information related to a conference. A user of the conference system 1 may connect to the conference server 20 from, for example, the information processing terminal 10, and the user may register a conference by specifying a conference name, date and time of a conference, a session password, a participation password, and conference materials, for example. Then, the conference server 20 may create a conference ID that uniquely identifies a registered conference and a document ID that indicates a storage destination of the conference materials, and the conference server 20 may store the created conference ID and document ID in the conference information storage unit 203. FIG. 4 is a diagram showing an example of conference information. The conference information 3000 may include data items, such as a conference ID, a conference name, date and time of a conference, a conference status, a session password, a participation password, and a document ID.

The conference ID is information for uniquely identifying a conference that is registered in the conference server 20. The conference name is a name of a conference that is set by a user. The date and time of the conference is date and time for holding a conference that is set by a user. For example, if an attempt is made to hold a particular conference prior to the date and time for holding the particular conference that has already been set in the conference server 20, an error message may be displayed, for example, and the setting may not be made for the particular conference.

The conference ID is for exemplifying purpose only, and the conference ID is not limited to an ID that is used for a conference purpose. Namely, it suffices if the conference ID is an ID for identifying conference materials (electronic data) that are shared between the information processing terminal 10 and the conference server 20 or among a plurality of the information processing terminals 10.

The conference status is a status of a registered conference. For example, the conference status may be one of "to be held" that indicates that the conference will be held, "in session" that indicates that the conference is in session, and "closed" that indicates that the conference is closed. The session password is a password that is to be input by an organizer of a conference for holding the conference. By setting a session password, users who can hold a conference can be limited. The participation password is a password that is to be input by a user who participates in a conference that is in session. By setting a participation password, users who can participate in a conference that is in session can be limited.

The document ID is information related to a storage destination of conference materials that are to be used in a conference. The information processing terminal 10 of a participant of a conference can retrieve (download) conference materials from a storage destination that is specified by the document ID.

The user information 4000 is information related to users of the conference system 1. The information related to the users may be information such as a user ID and a password, for example.

The Room information 5000 is information related to participants of a conference. Here, for each of functions, the information related to the participants of the conference is associated with a conference ID. The Room information 5000 is stored in the Room information storage unit 204. Details of the Room information 5000 is described below.

<Details of Processes>
<<Process for Synchronizing a Page Turning Operation>>

Next, there are explained details of processes of the conference system 1 according to the embodiment.

First, a process is explained that is for causing a page turning operation and a memo writing operation to be synchronized at the information processing terminal $10_2$ (the information processing terminal $10_2$ of a participant) that is in the participant mode. Here, the page turning operation and a memo writing operation are made at the information processing terminal $10_1$ (the information processing terminal $10_1$ of a presenter) that is in the presenter mode. In the following, as an example, a process is explained for a case in which a page turning operation is made with respect to a conference document that is displayed by the presenter's information processing terminal $10_1$, and this page turning operation is reflected in a conference document that is displayed by the participant's information processing terminal $10_2$. FIG. 5 is a sequence diagram of an example of a process for synchronizing a page turning operation.

At step S101, a user (a presenter) of the presenter's information processing terminal $10_1$ makes a page turning operation with respect to the displayed conference document via the input device 501. At this time, the operation controller 102 receives an instruction from the input device 501, and the operation controller 102 sends information related to the received operation to the display controller 103. Then, the display controller 103 causes the page of the conference document that is displayed on the display device 502 of the presenter's information processing terminal $10_1$ to transition to the next page (or previous page). Here, the page of the conference document may be transitioned to a page that is specified by the user.

At step S102, the transmission/reception controller 101 sends information related to the transition destination page to the conference server. Here, the transition is caused by the page turning operation made by the user. The information related to the transition destination page may be a page number of the transition destination page of the conference document, for example.

At step S103, the conference server 20 stores the received information that is related to the transition destination page in a storage area. The process at step S103 may be omitted. However, by storing the information related to the transition destination page in the storage area by step S103, for example, a user who participates in the conference in the middle may synchronize the page of the conference document at the timing of participating in the conference in the middle. Namely, the information processing terminal 10 of the user who participates in the conference in the middle can display the page of the conference document that is displayed by the presenter's information processing terminal $10_1$ at the timing of participating in the conference in the middle by retrieving (downloading) the conference document and the information related to the transition destination page (the page number).

At step S104, the transmission/reception controller 201 transmits the information related to the transition destination page (the page number) to the participant's information processing terminal $10_2$.

At step S105, based on the received information that is related to the transition destination page (the page number), the display controller 103 causes the page of the conference document that is displayed to transition. In this manner, the page turning operation that is made by the user of the presenter's information processing terminal $10_1$ can be reflected at the participant's information processing terminal $10_2$. Consequently, the presenter and participant of the conference may conduct the conference while referring to the same page of the conference document.

<<Process of Selecting an Execution Function>>

Next, there is explained a process in which the conference server 20 determines a function corresponding to a request from the information processing terminal 10, and the function corresponding to the request is executed.

First, an outline of the process of selecting an function to be executed is explained. Hereinafter, a case is explained in which the conference server 20 executes a "conferencing/participation function" or a "conference preview function," in accordance with a request from the information processing terminal 10. Here, the conferencing/participation function is a function of the information processing terminal 10 that issues the request that is for executing this function for holding a conference (an electronic conference) by sharing and/or displaying a conference document among a plurality of information processing terminals 10, or is a function of the information processing terminal 10 for participating in a conference (an electronic conference) that is already in session. The conference preview function is a function of the information processing terminal 10 that issues the request that is for executing this function for displaying (viewing) a content of a conference document that is registered in the conference server 20. Namely, the conference preview function is a function that can only display a conference document. Unlike the conferencing/participation function, the conference preview function include neither a function for synchronizing a conference document with another information processing terminal of another participant nor a function for writing a memo.

Figure 6A:
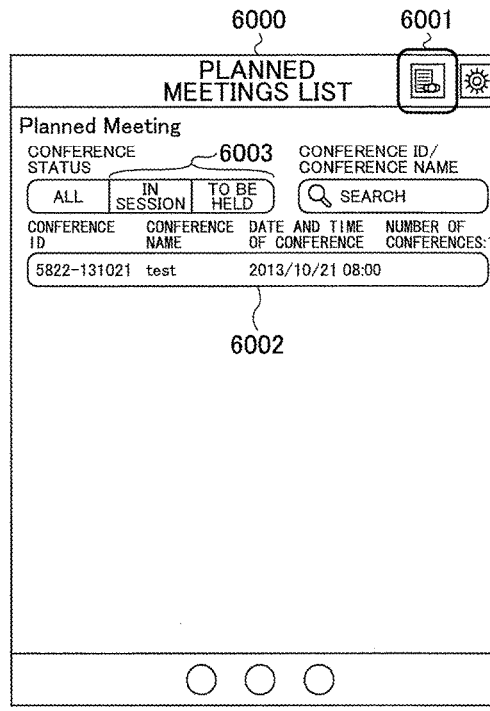

FIGS. 6A-6D are image diagrams of examples of a conferencing/participation screen and a conference preview screen. FIG. 6A is an image diagram of an example of the conferencing/participation selection screen 6000. In the conferencing/participation selection screen 6000, a conference preview function button 6001 and a conference list 6002 are displayed. Here, the conference preview function button 6001 is for causing a screen to transition to a conference preview selection screen, and the conference list 6002 is a list of conferences that are registered in the conference server 20. In this example, only one conference is shown in the conference list 6002. However, when a plurality of conferences is registered in the conference server 20, the conference list 6002 indicates a list of the plurality of conferences. By pressing one of conference state selection buttons 6003, a list of conferences that are in the selected status can be displayed.

Figure 6B:
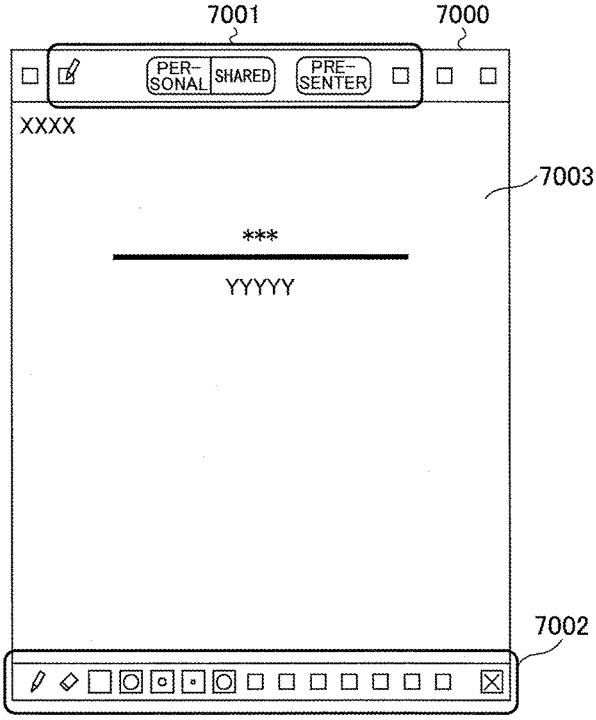

When a user selects a conference to be held or a conference to be participated in from the conference list 6002 through the input device 501, for example, a screen transitions to the conferencing/participation screen of FIG. 6B. At this time, if a session password or a participation password is set for the selected conference, the user may be prompted to input the session password or the participation password. The information related to the input session password or participation password is transmitted to the conference server 20 together with a connection request, thereby executing authentication.

FIG. 6B is an image diagram of an example of a conferencing/participation screen 7000. The conferencing/participation screen 7000 displays a display area 7001 that indicates whether the information processing terminal 10 is in the sharing mode or the personal mode and whether the information processing terminal 10 is in the presenter mode or the participant mode. In addition, in the conferencing/participation screen 7000, a palette 7002 is displayed that is for writing a memo on a conference document 7003 that is displayed.

Next, when a user presses the conference preview function button 6001 in FIG. 6A through the input device 501 or the like, a screen transitions to a conference preview selection screen 8000 that is shown in FIG. 6C. When a conference is selected in a list of conferences 8001 that are registered in the conference server 20 in the conference preview selection screen 8000, a screen transitions to the conference preview screen of FIG. 6D. In the conference preview screen 9000, a conference document 9001 is shown.

In the conference preview screen 9000, the display area 7001 and the palette 7002 that are shown in the conferencing/participation screen 7000 are not displayed, for example. In this manner, the conference preview screen 9000 is a screen that is formed by hiding a portion or all graphic user interface (GUI) components included in the display area 7001 and the palette 7002 of the conferencing/participation screen 7000.

In addition, from the above description, it can be said that the conference preview function is a function that is arranged by restricting a portion of the conferencing/participation function (for example, a function related to synchronous displaying). Thus, the conference preview function is a function that can be achieved by using a process that is in common with the conferencing/participation function.

As described above, a user of the information processing terminal 10 can select and execute the conferencing/participation function and the conference preview function.

Next, an outline of a process is explained in which, in response to a request from the information processing terminal 10, the conference server 20 determines whether the conferencing/participation function is to be executed or the conference preview function is to be executed, and the conference server 20 executes the function corresponding to the request.

Figure 7:
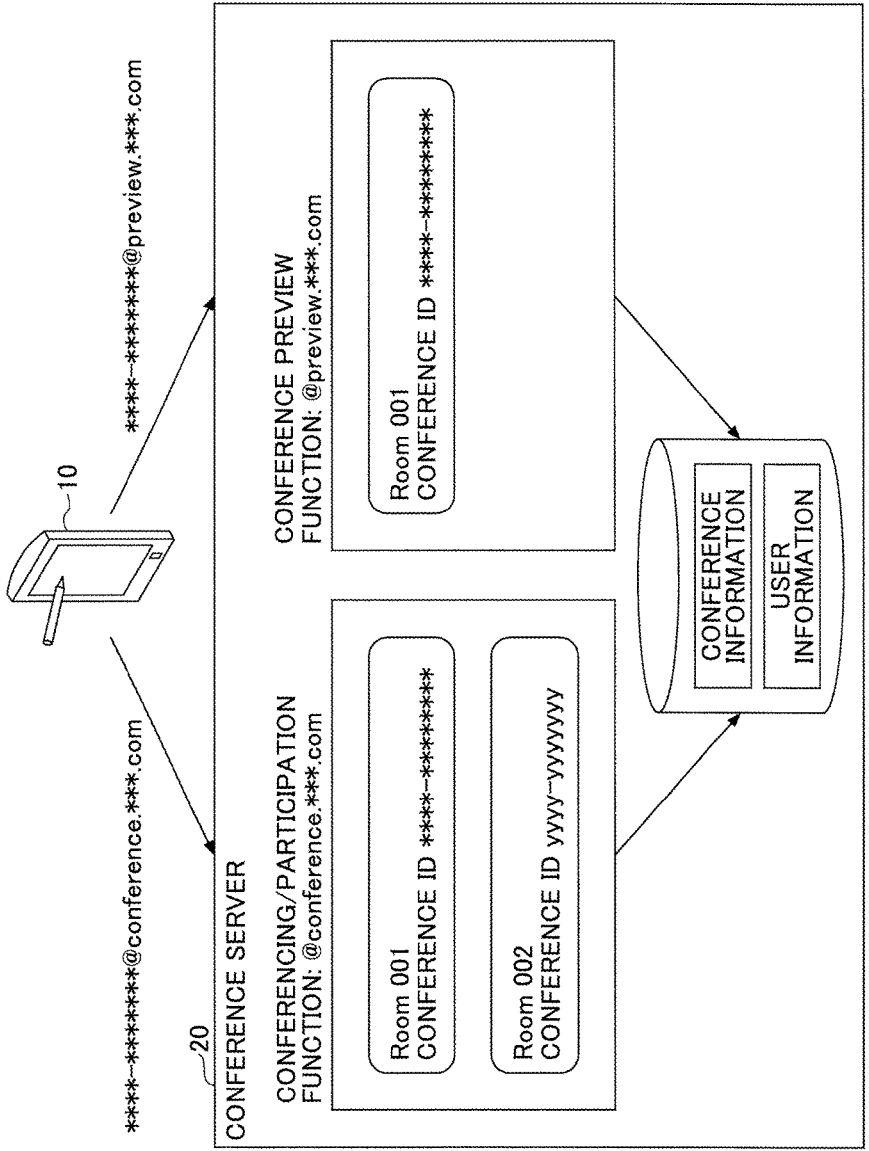
FIG. 7 is a diagram illustrating an example of a process of selecting an execution function.

FIG. 7 is a diagram illustrating an example of the process of selecting an execution function. When a conference is selected, for example, in the conference list 6002 in FIG. 6A or in the conference list 8001 in FIG. 6C, the information processing terminal 10 transmits a connection request that includes destination information corresponding to a function to the the conference server 20. Here, the destination information is information that can be expressed by the form of "conference ID@domain name."

The conference server 20 determines a function to be executed based on the domain name of the destination information that is included in the received connection request. In the example of FIG. 7, when the domain name of the destination information that is included in the received connection request is "@conference.*.com," the conferencing/participation function is to be executed. When the domain name is "@preview.*.com," the conference preview function is to be executed. Then, the conference server 20 creates or updates the Room information 5000 for each function and for each conference ID. The conference server 20 may execute holding/participation or preview of a conference by retrieving required information from the conference information. Here, the Room information 5000 is information related to users who participate in a conference (or who preview a conference) for each of the functions and for each of the conference IDs.

FIGS. 8A and 8B are configuration diagrams of examples of the Room information 5000. FIG. 8A is a configuration diagram of an example of conferencing/participation information 5100. The Room ID is information for uniquely identifying Room information 5000 for each function (the conferencing/participation function). The conference ID is identification information of a conference that is registered in the conference server 20. The data item of "participant" shown in FIGS. 8A and 8B indicates user information of users who are participating in a conference by using the conferencing/participation function (the user information 4000 of the users who are logged in to the information processing terminal 10). Here, the user information 4000 may be address information of the information processing terminal 10 (e.g., a MAC address or an IP address) or a telephone number. Alternatively or additionally, the user information 4000 may be an e-mail address of a user or identification information that is assigned to a user in the conference system 1.

When a request for executing the conferencing/participation function (that is a connection request that includes address information whose domain name is "@conference.\*\*\*.com") is received from the information processing terminal 10, the conference server 20 may create or update the conferencing/participation information, for example. Namely, when a conference is to be held (when the conferencing/participation information is missing for the conference ID that is included in the address information), the conference server 20 may create the conferencing/participation information for the corresponding conference ID.

When a user is to participate in a conference (when the conferencing/participation information already exists for the conference ID that is included in the address information), the conference server 20 may update the conferencing/participation information for the corresponding conference ID (user information is added to the data item of the "participant").

By using the above-described conferencing/participation information, for example, synchronous displaying of the conference materials can be executed among information processing terminals 10 of the users who are designated as participants for the same Room ID. For example, for the Room ID "Room 002," synchronous displaying of the conference document can be executed between the information processing terminal 10 of user 02 and the information processing terminal 10 of user 05. Namely, the conference server 20 may determine the destination of the message at step S104 of FIG. 5 by referring to the data item of the "participant" of the conferencing/participation information.

FIG. 8B is a configuration diagram of an example of conference preview information 5200 that is included in the Room information 5000. The Room ID is information for uniquely identifying Room information 5000 for each function (the conferencing/participation function). The conference ID is identification information of a conference that is registered in the conference server 20. The data item of "participant" indicates user information of users who are displaying conference materials by using the conference preview function (the user information 4000 of the users who are logged in to the information processing terminal 10). Here, the user information 4000 may be a physical address, such as a MAC address of the information processing terminal 10.

When a request for executing the conference preview function (that is a connection request that includes address information whose domain name is "@preview.\*\*\*.com") is received from the information processing terminal 10, the conference server 20 may create or update the conference preview information, for example. Namely, when the conference preview information is missing for the conference ID that is included in the address information, the conference server 20 may create the conference preview information for the corresponding conference ID.

When the conference preview information already exists for the conference ID that is included in the address information, the conference server 20 may update the conference preview information of the corresponding conference ID (the user information 4000 is added to the data item of the "participant").

Unlike the conferencing/participation information, with the conference preview information, synchronous displaying of the conference materials may not be executed among information processing terminals 10 of the users who are designated as participants for the same Room ID, for example.

When a user exits from the conference room (terminates the conference) and/or when a user terminates executing the conference preview function, the user information 4000 of the user who exits from the conference room and/or the user information 4000 of the user who terminates executing the conference preview function are deleted from the data item of the "participant."

Next, a flow of a process is explained in which the conference server 20 determines a function that corresponds to a request from the information processing terminal 10, and the conference server 20 executes the function that corresponds to the request. FIG. 9 is a flowchart of an example of a process of selecting an execution function.

At step S201, a user causes, by a predetermined operation, the display device 502 of the information processing terminal 10 to display a list of conferences for which the conferencing/participation function or the conference preview function is to be executed. Namely, the user causes the display device 502 of the information processing terminal 10 to display the conferencing/participation selection screen 6000 or the conference preview selection screen 8000.

At step S202, the user selects a conference from the list of the conferences from the conferencing/participation screen or the conference preview screen.

At step S203, the information processor 104 of the information processing terminal 10 determines a function that is to be executed in the conference that is selected by the user. Namely, when the user selects a conference from a list of conferences in the conferencing/participation screen, the process proceeds to step S204. When the user selects a conference from a list of conferences in the conference preview screen, the process proceeds to step S205.

At step S204, the message generator 1041 of the information processing terminal 10 creates a connection request (a message) that includes destination information corresponding to the conference ID of the selected conference and the function. For example, when the conference ID of the selected conference is "\*\*\*\*-\*\*\*\*\*\*\*," the message generator 1041 of the information processing terminal 10 creates, for example, the message that is shown in FIG. 10. Here, the portion "@conference.\*\*\*.com" (the domain name of the destination information) indicates that the message is a request for executing the conferencing/participation function.

At step S205, the message generator 1041 of the information processing terminal 10 creates a connection request (a message) that includes destination information corresponding to the conference ID of the selected conference and the function. For example, when the conference ID of the selected conference is "\*\*\*\*-\*\*\*\*\*\*\*," the message generator 1041 of the information processing terminal 10 creates, for example, the message that is shown in FIG. 11. Here, the portion "@preview.***.com" (the domain name of the destination information) shows that the message is a request for executing the conference preview function.

At step S206, the transmission/reception controller 101 of the information processing terminal 10 transmits the message that is created at the process of step S205 to the conference server 20, thereby making a connection request.

At step S207, the conference server 20 may create and/or update the Room information 5000. The details of creating and/or updating the Room information 5000 are described below.

At step S208, the display controller 103 of the information processing terminal 10 creates a display screen in response to the connection request from the conference server 20, and the display controller 103 displays the screen. Namely, as a response to a connection request that specifies the conferencing/participation function, the display controller 103 creates the screen of FIG. 6B, for example. Further, as a response to a connection request that specifies the conference preview function, the display controller 103 creates the screen of FIG. 6D, for example.

In this manner, the information processing terminal 10 can create, depending on a function to be executed, a connection request (message) that is to be transmitted to the conference server 20. Further, by referring to the destination information that is included in the received connection request (message), the conference server 20 can determine a function to be executed that is requested from the information processing terminal 10.

In this manner, the function that is to be executed by the conference server 20 can be switched depending on the destination information. Accordingly, when a function (e.g., the conference preview function) is to be added that can be achieved by using a process that is in common with a function that has already been installed (e.g., the conferencing/participation function), the function can be added without adding an application program interface (API), for example. Namely, when a function is to be added that can be achieved by using a process that is in common with an already existing function, the additional function can be achieved by providing the destination information to the conference server 20 during invocation of the process by the function to be added.

Accordingly, when a function is to be added that can be achieved by using a process that is the same as the process of the function that has already been installed, an amount of modifying application programs that are installed in the information processing terminal 10 and the conference server 20 can be significantly reduced. Thus, a function can be added quickly and at low cost.

Additionally, for the display screen of the information processing terminal 10 that is related to the function to be added, by hiding a portion of the GUI components that are to be used for the already installed function (or by adding and displaying a part of the GUI components), an amount of addition and/or modification of the display components of the user interface can be significantly reduced. Thus, similar to the above description, a function can be added quickly and at low cost.

With respect to the above-described function that can be achieved by using a process that is in common with the conferencing/participation function, examples can be considered, such as a function for holding a conference for which the authentication is stricter than that of a normal function (a VIP function); a function of holding a conference in which information, such as a written memo, is not stored in a storage area (a rehearsal function); a function for enabling transmission of query information from a participant to a presenter or from a presenter to a participant (a query function), a function to set a number of participants that can simultaneously participate in a conference to be greater than usual (a multi-site conferencing function), and so forth.

For the above-described function that can be achieved by using the process that is in common with the conferencing/participation function, the conference server 20 may determine whether the information processing terminal can utilize the function, based on billing information (e.g., free or paid) that is associated with user information of a participant that is maintained by the conference server 20. For example, during logging in to the conference server 20 by the information processing terminal 10, when a determination is made that the user is not a paid user based on the billing information that is associated with the user information 4000, the conference server 20 may transmit, to the information processing terminal 10, a request for restricting the use of a specific function (e.g. the VIP function) among the above-described functions. Then, at step S203 that is described above, the information processing terminal 10 that receives the request for restricting the use may control the message generator 1041, so that the message generator 1041 is disallowed to create a message (a connection request) corresponding to the specific function. In contrast, when a determination is made that the user is a paid user, the conference server 20 may transmit, to the information processing terminal 10, information indicating that the specific function (e.g., the VIP function) can be used. Then, at step S203 that is described above, the information processing terminal 10 that receives the information indicating that the specific function can be used may control the massage generator 1041, so that the message generator 1041 is allowed to create a message (a connection request) corresponding to the specific function.

Figure 12:
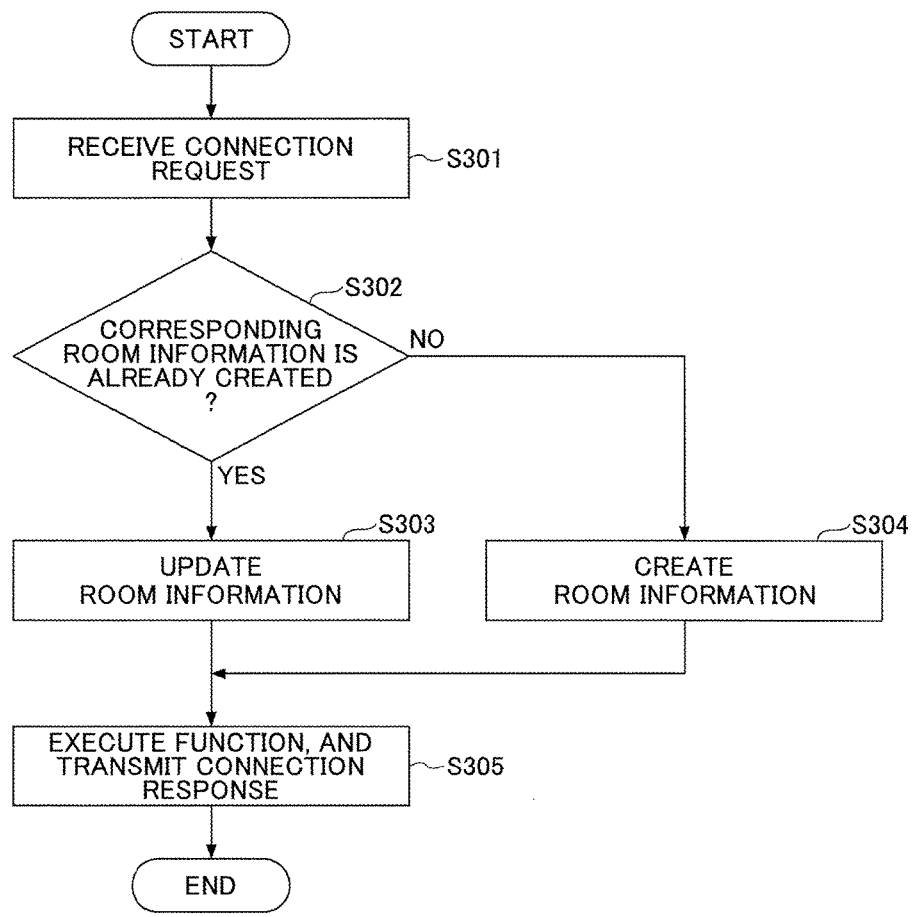
FIG. 12 is a flowchart of an example of a Room information creation/updating process.

Next, there are explained the details of the Room information creation/updating process at step S207 of FIG. 9. FIG. 12 is a flowchart of an example of the Room information creation/updating process.

At step S301, the transmission/reception controller 201 of the conference server 20 receives a connection request that includes destination information from the information processing terminal 10.

At step S302, the information processor 202 of the conference server 20 determines whether the corresponding Room information is already created or not. Namely, a determination is made as to whether Room information exists that corresponds to the conference ID and the function that are specified by the conference ID and the domain name of the received destination information. When the corresponding Room information exists (YES), the process proceeds to step S303. When the corresponding Room information does not exist (NO), the process proceeds to step S304.

At step S303, the conference server 20 updates the data item of the "participant" of the Room information 5000 depending on the conference ID and the domain name that are included in the destination information. Namely, the conference server 20 adds, to the data item of the "participant" of the corresponding Room information, user information of a user who logs in to the information processing terminal 10 that transmits the connection request.

At step S304, the conference server 20 creates Room information based on the conference ID and the domain name that are included in the destination information. In other words, the conference server 20 selects a number for the Room ID, so that the Room ID becomes unique for each function. Additionally, the conference server 20 adds, to the data item of the "participant," user information of the user who logs in to the information processing terminal 10 that transmits the connection request.

At step S305, the function execution unit 2022 of the conference server 20 executes a function that is specified by the domain name that is included in the destination information. In addition, the transmission/reception controller 201 of the conference server 20 transmits a connection response to the information processing terminal 10. Here, the connection response may include information that is associated with the conference ID (e.g., the conference information, such as the document ID), for example.

As described above, the conference server 20 may receive a connection request (a message) that includes destination information from the information processing terminal 10, and the conference server 20 may create and/or update Room information based on the conference ID and the domain name that are included in the destination information. Then, as described above, by using the Room information (and the conference information, the user information 4000, etc.), the conference server 20 may execute various types of functions, such as a function for holding a conference, a function for participating in a conference, or a function for previewing conference materials.

CONCLUSION

As described above, in the conference system 1 according to the embodiment, a connection request (a message) corresponding to a function that is selected by a user in the information processing terminal 10 can be generated, and the connection request can be transmitted to the conference server 20. Then, the conference server 20 can execute the function, based on the received connection request (message).

In the conference system 1 according to the embodiment, the function that is to be executed by the conference server 20 can be determined based on the destination information that is included in the connection request (the message). In this manner, when a function (e.g., the conference preview function) is to be added that can be achieved by using a process that is in common with a function that is already installed (e.g., the conferencing/participation function), the function can be added without adding an application program interface (API), for example.

Accordingly, when a function is to be added that can be achieved by using a process that is the same as the process of the function that has already been installed, an amount of modifying application programs that are installed in the information processing terminal 10 and the conference server 20 can be significantly reduced. Thus, a function can be added quickly and at low cost.

In the above description, the conference system 1 may be an example of an information processing system. The transmission/reception controller 101 may be an example of a request transmitter. The function determining unit 2021 may be an example of a determining unit. The function execution unit 2022 may be an example of a processor. The Room information storage unit 203 may be an example of a storage unit. The display controller 103 may be an example of a display unit. The conference ID that is included in the destination information may be an example of first identification information. The domain name that is included in the destination information may be an example of second identification information.

The information processing system, the information processing device, the information processing method, and the program are explained above by the embodiment. However, the present invention is not limited to the above-described embodiment, and various variations and modifications may be made without departing from the scope of the claims.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can comprise any suitable programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may be implemented by any desired type of any desired number of processor. The RAM may be implemented by any desired type of volatile or non-volatile memory. The HDD may be implemented by any desired type of non-volatile memory capable of storing a large amount of data. The hardware resources may additionally include an input device, an output device, or a network device, depending on the type of the apparatus. Alternatively, the HDD may be provided outside the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-245708 filed on Nov. 28, 2013, and Japanese Priority Application No. 2014-205044 filed on Oct. 3, 2014, the entire contents of which are hereby incorporated herein by reference.

What is claimed is:

1. An information processing system including applications that are included in a plurality of information processing terminals, and an information processing device for executing a conferencing function in response to a request from one or more of the applications, wherein the information processing device is connected to the information processing system, the information processing device including a storage device configured to store material information to be shared among the applications that are included in the plurality of the information processing terminals, and the information processing system comprises:
   a memory having computer readable instructions stored thereon; and
   at least one processor configured to execute the computer readable instructions to, transmit a request including first identification information and second identification information, wherein the first identification information is for identifying user information that is used for executing the conferencing function, and the second identification information is destination information including a domain name and conference information, the domain name identifying a plurality of different conferencing functions that are to be executed based on the user information that is identified by the first identification information and the conference information, the conferencing functions being teleconferencing functions performable during the conference; and execute the plurality of conferencing functions that are identified based on the second identification information included in the request, wherein the plurality of different conferencing functions includes, a preview function for performing an operation by the application that is included in the information processing terminal on the material information with another application that is included in another information processing terminal, and the preview function further including not storing results of the operation by the application that is included in the information processing terminal and the another application that is included in the another information processing terminal, and the at least one processor is further configured to execute the computer readable instructions to, add a new function to the plurality of different conferencing functions using at least one of the existing conferencing functions of the plurality of different conferencing functions, and providing new destination information as a name for the new function.

2. The information processing system according to claim 1, wherein the at least one processor is further configured to:

determine the conferencing function to be executed among the plurality of different conferencing functions based on the second identification information; and execute the determined conferencing function by using the user information that is identified based on the first identification information.

3. The information processing system according to claim 1, wherein the at least one processor is further configured to:

store in the memory, for each of the first identification and for each of the second identification, information about the conferencing function that is to be executed based on the request from the application that is installed on the information processing terminal.

4. The information processing system according to claim 3, wherein the user information about the conferencing function that is to be executed is user information of a user who logs in to the information processing terminal and/or a physical address of the information processing terminal.

5. The information processing system according to claim 1, further comprising:

a display device configured to display, on the information processing terminal, an execution result of the executed conferencing function; and wherein the at least one processor is further configured to display on the display device a common execution result that is common among the plurality of different conferencing functions, and add a graphical user interface component to the common execution result and display the common execution result based on the executed conferencing function, or configured to delete a graphical user interface component from the common execution result and display the common execution result depending on the executed conferencing function.

6. The information processing system according to claim 1, wherein the information processing device includes a storage device configured to store material information to be shared among the applications that are included in the plurality of the information processing terminals;

the user information that is identified based on the first identification information includes the material information; and the plurality of different conferencing functions includes, a synchronizing function for synchronizing an operation by the application that is included in the information processing terminal on the material information with another application that is included in another information processing terminal that is participated in a same conference.

7. An information processing device that is connected to applications that are included in a plurality of information processing terminals, wherein the information processing device is for executing a conferencing function in response to a request from one or more of the applications, the information processing device including a storage device configured to store material information to be shared among the applications that are included in the plurality of the information processing terminals, and the information processing device comprises:

a memory having computer readable instructions stored thereon; and at least one processor configured to execute the computer readable instructions to, receive the request including first identification information and second identification information, wherein the first identification information is for identifying user information that is used for executing the conferencing function, and the second identification information is destination information including a domain name and conference information, the domain name identifying a plurality of different conferencing functions that are to be executed by using the information that is identified by the first identification information and the conference information, the conferencing functions being teleconferencing functions performable during the conference; and execute the plurality of conferencing functions that are identified based on the second identification information included in the received request, wherein the plurality of different conferencing functions includes, a preview function for performing an operation by the application that is included in the information processing terminal on the material information with another application that is included in another information processing terminal, and the preview function further including not storing results of the operation by the application that is included in the information processing terminal and the another application that is included in the another information processing terminal, and the at least one processor is further configured to execute the computer readable instructions to,
add a new function to the plurality of different conferencing functions using at least one of the existing conferencing functions of the plurality of different conferencing functions, and providing new destination information as a name for the new function.

8. An information processing method to be executed by an information processing device that is connected to applications that are included in a plurality of information processing terminals, wherein the information processing device is for executing a function in response to a request from one or more of the applications, the information processing device including a storage device configured to store material information to be shared among the applications that are included in the plurality of the information processing terminals, wherein the information processing method comprises:
receiving, using at least one processor, the request including first identification information and second identification information, wherein the first identification information is for identifying user information that is used for executing the conferencing function, and the second identification information is destination information including a domain name and conference information, the domain name identifying a plurality of different conferencing functions that are to be executed by using the information that is identified by the first identification information and the conference information, the conferencing functions being teleconferencing functions performable during the conference;
executing, using the at least one processor, the plurality of conferencing functions that are identified based on the second identification information included in the received request, wherein the plurality of different conferencing functions includes,
a preview function for performing an operation by the application that is included in the information processing terminal on the material information with another application that is included in another information processing terminal, and the preview function further including not storing results of the operation by the application that is included in the information processing terminal and the another application that is included in the another information processing terminal; and
adding, using the at least one processor, a new function to the plurality of different conferencing functions using at least one of the existing conferencing functions of the plurality of different conferencing functions, and providing new destination information as a name for the new function.

9. The information processing device according to claim 7, wherein the at least one processor is further configured to:
determine the conferencing function to be executed among the plurality of different conferencing functions based on the second identification information; and
execute the determined conferencing function by using the user information that is identified based on the first identification information.

10. The information processing device according to claim 7, wherein the at least one processor is further configured to:
store in the memory, for each of the first identification and for each of the second identification, information about the conferencing function that is to be executed based on the request from the application that is installed on the information processing terminal.

11. The information processing device according to claim 10, wherein the user information about the conferencing function that is to be executed is user information of a user who logs in to the information processing terminal and/or a physical address of the information processing terminal.

12. The information processing device according to claim 7, further comprising:
a display device configured to display, on the information processing terminal, an execution result of the executed conferencing function; and
wherein the at least one processor is further configured to display on the display device a common execution result that is common among the plurality of different conferencing functions, and
add a graphical user interface component to the common execution result and display the common execution result based on the executed conferencing function, or configured to delete a graphical user interface component from the common execution result and display the common execution result depending on the executed conferencing function.

13. The information processing device according to claim 7, further comprising:
a storage device configured to store material information to be shared among the applications that are included in the plurality of the information processing terminals; and wherein
the user information that is identified based on the first identification information includes the material information; and
the plurality of different conferencing functions includes,
a synchronizing function for synchronizing an operation by the application that is included in the information processing terminal on the material information with another application that is included in another information processing terminal that is participated in a same conference.

14. The information processing method according to claim 8, further comprising:
determining, using the at least one processor, a conferencing function to be executed among the plurality of different conferencing functions based on the second identification information that is included in the received request; and
executing, using the at least one processor, the determined conferencing function by using the user information that is identified based on the first identification information.

15. The information processing method according to claim 8, further comprising:
storing, using the at least one processor, for each of the first identification and for each of the second identification, information about the conferencing function that is to be executed based on the request from the application that is installed on the information processing terminal in memory.

16. The information processing method according to claim 15,
wherein the user information about the conferencing function that is to be executed is user information of a user who logs in to the information processing terminal and/or a physical address of the information processing terminal.

17. The information processing method according to claim 8, further comprising:

displaying, using the at least one processor, on a display device a common execution result that is common among the plurality of different conferencing functions; and adding, using the at least one processor, a graphical user interface component to the common execution result and display the common execution result based on the executed conferencing function, or configured to delete a graphical user interface component from the common execution result and display the common execution result depending on the executed conferencing function.

\* \* \* \* \*